United States Patent
Kim et al.

(10) Patent No.: US 7,202,866 B2
(45) Date of Patent: Apr. 10, 2007

(54) APPARATUS AND METHOD OF BROWSING IMAGE DATA BASED ON COLOR TEMPERATURE, AND COMPUTER READABLE MEDIUM THEREFOR

(75) Inventors: Sang-kyun Kim, Kyungki-do (KR); Chang-yeong Kim, Kyungki-do (KR); Du-sik Park, Kyungki-do (KR); Seong-deok Lee, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 386 days.

(21) Appl. No.: 10/188,852

(22) Filed: Jul. 5, 2002

(65) Prior Publication Data

US 2003/0009454 A1 Jan. 9, 2003

(30) Foreign Application Priority Data

Jul. 9, 2001 (KR) .......................... 2001-0040898

(51) Int. Cl.
G06T 15/00 (2006.01)
(52) U.S. Cl. .................. 345/426; 345/581; 345/593
(58) Field of Classification Search ................ 345/426, 345/581, 589, 591, 593, 594
See application file for complete search history.

(56) References Cited

U.S. PATENT DOCUMENTS 6,108,037 A 8/2000 Takei 6,249,601 B1 6/2001 Kim et al.

FOREIGN PATENT DOCUMENTS

JP A-10-118862 5/1998
JP 10-240752 9/1998

(Continued)

OTHER PUBLICATIONS

Hirata et al., "Media-based Navigation for Hypermedia Systems", 1993, ACM, pp. 159-173.*

(Continued)

*Primary Examiner*—Phu K. Nguyen
(74) *Attorney, Agent, or Firm*—Buchanan Ingersoll & Rooney PC

(57) ABSTRACT

An image browsing apparatus capable of calculating color temperature of an image and browsing the image based on the color temperature, and a method of browsing an image are provided. The image browsing apparatus includes a data storage unit for storing a plurality of image data; a color temperature calculator for calculating the color temperature of each image and storing the calculated color temperature in the data storage unit; a command input unit for inputting an image browsing mode; and a color temperature browser for classifying images corresponding to the browsing mode using the color temperature as an image search condition and then, browsing the classified images. The method of browsing images includes determining the color temperature of an input image when a browsing mode is input; and browsing images when the color temperature falls within the color temperature range of the browsing mode.

41 Claims, 7 Drawing Sheets

FOREIGN PATENT DOCUMENTS

| | | |
|---|---|---|
| JP | 2000-90115 | 3/2000 |
| JP | 2001095009 | 4/2001 |
| JP | 2001141569 | 5/2001 |
| JP | 2001160057 | 6/2001 |
| KR | B1-10-0230446 | 11/1998 |
| KR | B1-10-0237284 | 11/1998 |

OTHER PUBLICATIONS

European Search Report issued by the European Patent Office on Aug. 31, 2004 in corresponding application EP 02 25 4749.

J. M. Corridoni et al., "Image Query by Semantical Color Content", Proceedings of the Workshop on Advanced Visual Interfaces, May 27, 1996, pp. 213-222, XP-002289265.

A. Del Bimbo, "Issues and Directions in Visual Information Retrieval", Pattern Recognition, 2000, Proceedings, 15th International Conference on Spe. 3-7, 2000, Los Alamitos, CA, USA, IEEE Comput. Soc., US.

A. Del Bimbo, "A Perspective View on Visual Information Retrieval Systems", Content-based Access of Image and Video Libraries, 1998. Proceedings. IEEE Workshop, Santa Barbara, CA, USA, Jun. 21, 1998, Los Alamitos, CA, USA, IEEE, Comput. Soc, US, XP-010293866.

Bit, Vol. 31, No. 10, Oct. 1999, pp. 23-34 with English translation of selection 4.

Naoki Utsuno et al., "Graphical features of Textile pictures, related to Impressions," ITE Technical Report, vol. 18, No. 27, May 1994, pp. 7-12.

\* cited by examiner

APPARATUS AND METHOD OF BROWSING IMAGE DATA BASED ON COLOR TEMPERATURE, AND COMPUTER READABLE MEDIUM THEREFOR

Priority is claimed to Patent Application Number 2001-40898 filed in Republic of Korea on Jul. 9, 2001, herein incorporated by reference.

BACKGROUND OF THE INVENTION

1. Field of the Invention

The present invention relates to an image browsing apparatus, and more particularly, to an image browsing apparatus capable of calculating color temperature of an image and browsing the image and/or an image database based on the color temperature, and a method of browsing an image and/or image database.

2. Description of the Related Art

In general, a color image is recognized by three factors, i.e., hue, saturation, and brightness. The word 'color' we use signifies the tone of color such as green and yellow. Features of the tone of color of an image, such as the spacious distribution and structural position of color in an image or dominant colors, are used as conditions of searching an image to be displayed.

Each color constituting an image makes an observer have different impressions. For instance, a red or yellow tone image produces a warm impression to an observer, and a blue or purple tone image, a cool impression. The extent of the impression of a color image that a human being perceives is called color temperature or correlated color temperature, which can be an important factor that defines what color is to be searched. In fact, when those who work in manufacturing companies or advertising agencies have to express an image of a product they wish to advertise, they may take a lot of time and effort in finding out a background image that fits the image of the product. For instance, if a background image is required for a propaganda poster for advertising newly developed beer, the related advertising agency may want cool impression of the Arctic ocean or warm impression of the Sunday set of the tropical regions according to an advertising concept. In this case, since the color temperature of an image can be used in searching a background image, it is possible to easily find images having similar impressions even if stored in an out of enormous image database. However, the most image data is generally classified only according to the physical characteristics of an image such as the spacious distribution of color, the structural position of color, and dominant colors. That is, the most image data does not include information on the quantified color temperature of an image. For this reason, it is difficult to search a desired image that is in accordance with an observer's likely feeling regarding an image such as warmth or coolness.

SUMMARY OF THE INVENTION

To solve the above problems, it is an object of the present invention to provide an apparatus for browsing images that fits an observer's likely impression on the image by calculating the color temperature of the image, and then searching the desired image based on the calculated color temperature, and a method therefor.

To achieve one aspect of the above object, there is provided an image browsing apparatus including a command input unit for inputting an image browsing mode, a color temperature calculator for calculating the color temperature of an input image, and a color temperature browser for browsing the image when the color temperature falls within the color temperature range of the browsing mode.

To achieve another aspect of the above object, there is provided an image browsing apparatus including a data storage unit for storing a plurality of image data, a color temperature calculator for calculating the color temperature of each image and storing the calculated color temperature in the data storage unit, a command input unit for inputting an image browsing mode, and a color temperature browser for classifying images corresponding to the browsing mode using the color temperature as an image search condition and then, browsing the classified images.

To achieve still another aspect of the above object, there is provided a method of browsing images including determining the color temperature of an input image when a browsing mode is input, and browsing images when the color temperature falls within the color temperature range of the browsing mode.

To achieve still another aspect of the above object, there is provided a method of browsing images, the method including determining the color temperature of a plurality of input images, storing the color temperature regarding the relevant images, classifying images corresponding to the browsing mode, using the color temperature as image search condition when a browsing mode is input, and browsing the classified images.

To achieve still another aspect of the above object, there is provided an image browsing apparatus comprising an image data storage unit for storing an input image, a color temperature calculator for calculating the color temperature of the input image, a metadata generator for generating metadata regarding the input image according to color temperature calculated by the color temperature calculator, a metadata storage unit for storing the metadata generated by the metadata generator, a command input unit to which an image browsing mode is input by a user, and a color temperature browser for searching metadata representing the image in the range of color temperature to be searched in the image browsing mode, receiving an image corresponding to the searched metadata from the image data storage unit, and outputting the received image.

To achieve still another aspect of the above object, there is provided an image browsing method including (a) calculating the color temperature of an input image, (b) finding one of predetermined sections of a color temperature range to which the color temperature of the input image belongs, and generating and storing metadata having a descriptor that describes information regarding the section to which the color temperature of the input image belongs, (c) searching metadata having the descriptor describing a section to which the color temperature of a selected browsing mode, and (d) browsing an image corresponding to the searched metadata.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
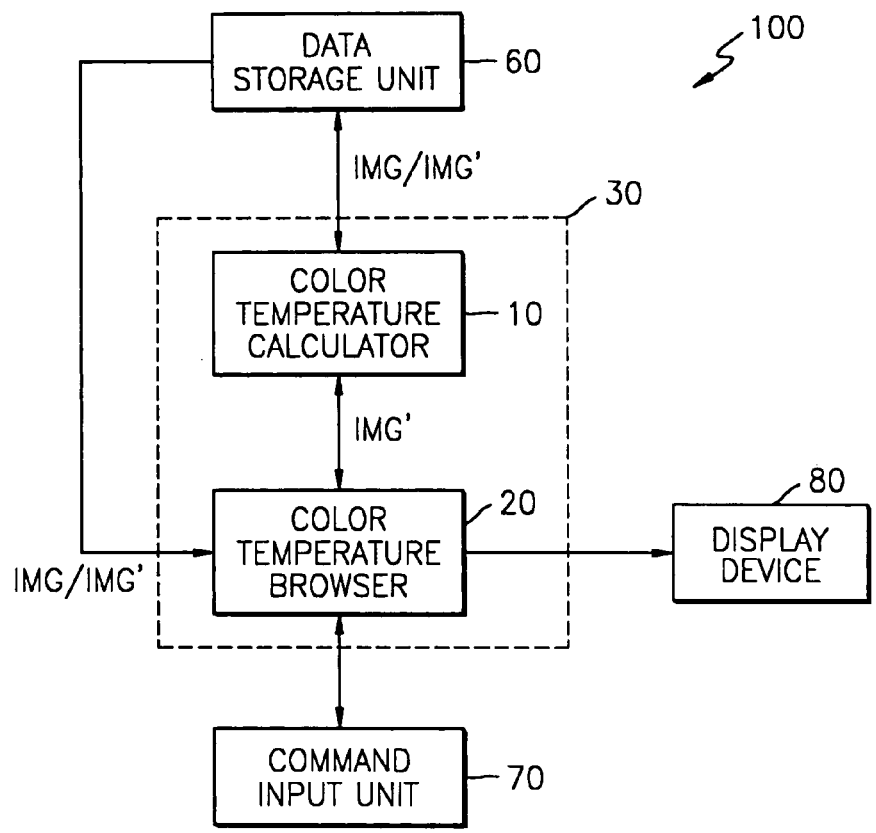
FIG. 1 is a block diagram of one embodiment of an image display apparatus having the image browsing apparatus according to the present invention.

FIG. 1 is a block diagram of an embodiment of an image display apparatus 100 having the image browsing apparatus 30 according to the present invention. Referring to FIG. 1, the image display apparatus 100 includes the image browsing apparatus 30 for selecting a desired image, a data storage unit 60 for writing and/or reading an image data or information, a command input unit 70 for inputting browsing conditions, and a display device 80. Here, the image browsing apparatus 30 includes a color temperature calculator 10 and a color temperature browser 20. The color temperature calculator 10 calculates the color temperature of an image, and the color temperature browser 20 browses an image that satisfies browsing conditions, using the color temperature as a search word for a desired image. The data storage unit 60 is a means for storing a plurality of image data, and may be database that contains a mass of image data. Such database may contain a plurality of still images such as a photograph, or video image data such as movies or dramas. Image data that is stored in the data storage unit 60 may be constructed in the form of metadata.

Hereinafter, the operations of the image browsing apparatus 30 and the image display apparatus 100 will now be described referring to FIG. 1. The color temperature calculator 10 calculates the color temperature IMG' of an image IMG stored in the data storage unit 60, and then transmits the calculated color temperature IMG' to the data storage unit 60 or the color temperature browser 20. When a browsing mode, which is a browsing condition output from the command input unit 70, is selected, the color temperature browser 20 detects the color temperature IMG' transmitted by the color temperature calculator 10 or the data storage unit 60, and browses an image that satisfies searching conditions. The display 80 displays browsing results IMG_BRS generated by the color temperature browser 20. At this time, the image browsing apparatus 30 stores the color temperature IMG', which is calculated by the color temperature calculator 10, in the data storage unit 60, and uses the stored color temperature IMG' in browsing images. Otherwise, the image browsing apparatus 30 receives the color temperature IMG' directly from the color temperature calculator 10, and then uses it in browsing images. Each image is usually classified into at least one color group according to its color temperature and then browsed, which will later be described in detail. A browsing mode is a kind of a selection mode of selecting one of groups consisting of similar images, being classified according to the color temperature IMG' of an image, e.g., hot, warm, moderate, or cool image.

Figure 2:
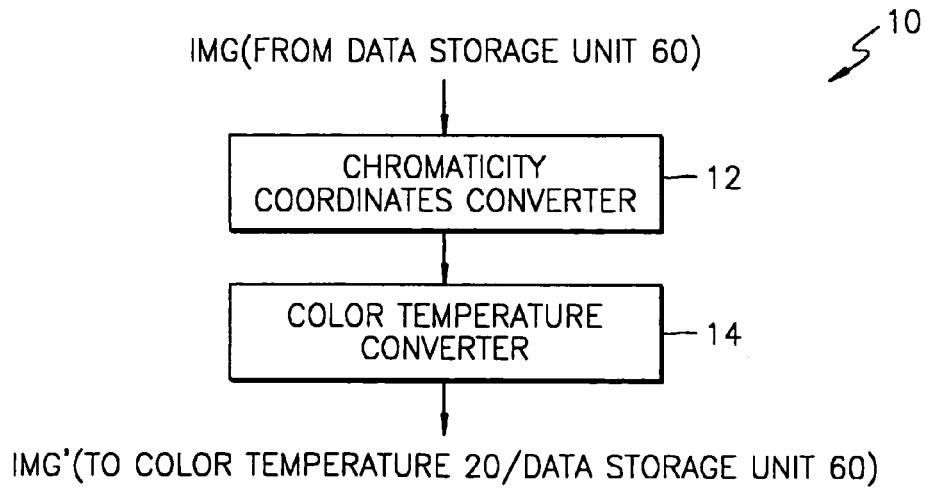
FIG. 2 is a block diagram of the color temperature calculator of FIG. 1.
Figure 3:
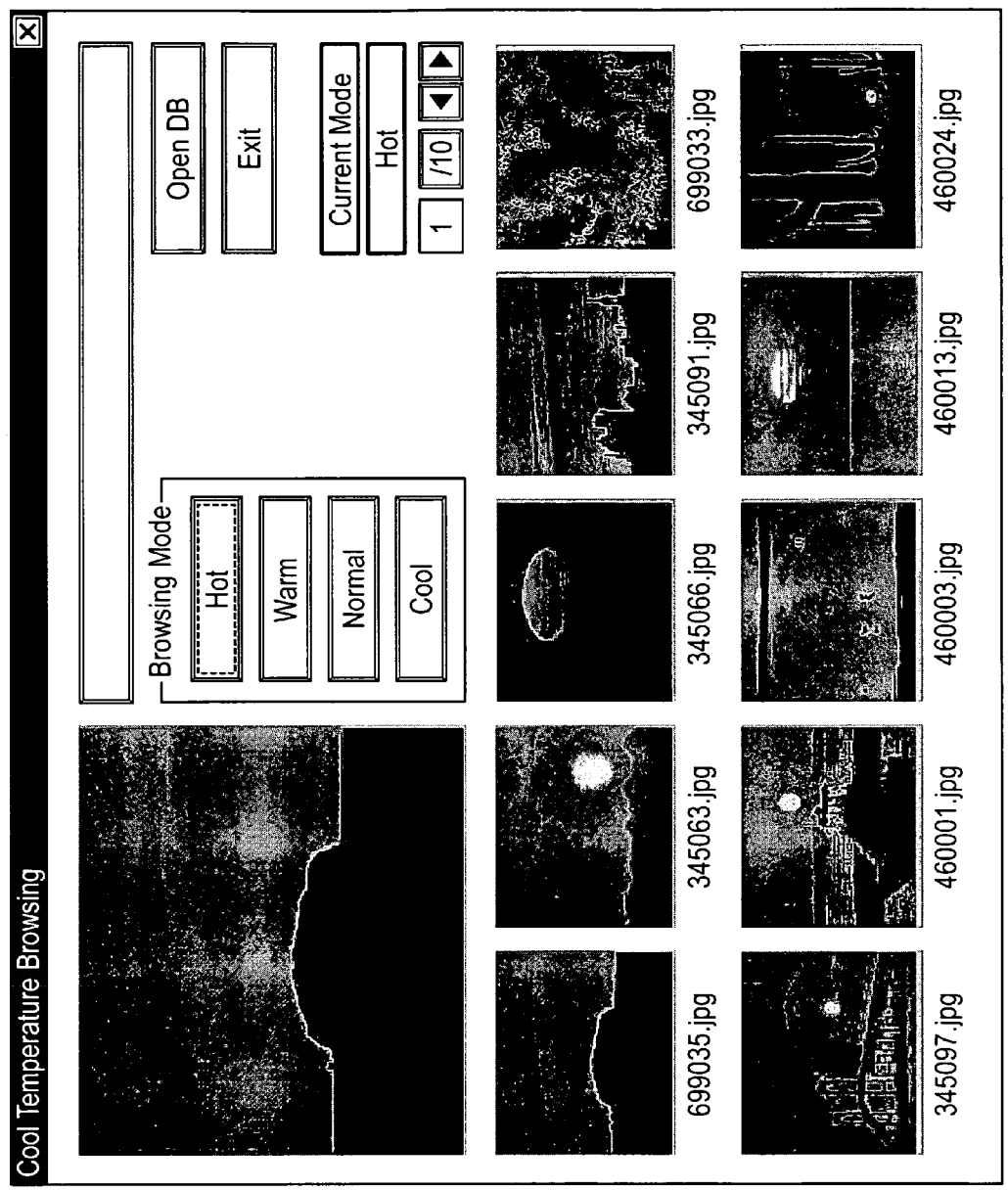
FIG. 3 is a view of an example of image browsing performed by the image display apparatus of FIG. 1.

FIG. 2 is a block diagram of the color temperature calculator 10 of FIG. 1, and FIG. 3 is a view of an example of image browsing performed by the image display apparatus 100 of FIG. 1

Referring to FIGS. 1 and 2, the color temperature calculator 10 includes a chromaticity coordinates converter 12 that converts the coordinates of an image into chromaticity coordinates of a light source, and then determines the illuminating color of the image based on the converted chromaticity coordinates; and a color temperature converter 14 that converts the illuminating color into the color temperature of the image. The chromaticity coordinates converter 12 converts an image IMG input into the CIE (Commission Internationale de L'Eclairage) X, Y, Z color space so as to convert the coordinates of an image IMG transmitted from the data storage unit 60 into chromaticity coordinates of a light source [see step 121 of FIG. 4 and step 1210 of FIG. 5]. Here, the CIE X, Y, Z color space is a color specification system that indicates colors with X, Y, Z, which was established on 1931 by the CIE. After the coordinates of an image are converted into the CIE X, Y, Z color space, the chromaticity coordinates converter 12 converts the image IMG of the CIE X, Y, Z color space, into the chromaticity coordinates of a light source [see step 122 of FIG. 4 and step 1220 of FIG. 5]. If the coordinates of the image IMG is converted into the chromaticity coordinates of a light source, the chromaticity coordinates converter 12 calculates the illuminating color of the image based on the converted chromaticity coordinates [see step 123 of FIG. 4 and step 1230 of FIG. 5]. Here, the chromaticity coordinates of a light source are two-dimensional coordinates x and y of three-dimensional color space made of the CIE X, Y, Z color space, which are mainly used in the chromatic engineering science.

There are many ways of detecting the illuminating color of an image in the chromaticity coordinates of a light source. One way is to use the density of the tone of color. In detail, the angle and distance between a white reference point and each point in the chromaticity coordinates are measured, and then, two images obtained from the measured angle and distance are combined with each other. Next, pixels having the same values are collected from the combined image, and then, the major illuminating color is determined as the illuminating color which most color sets belong to. This method is disclosed in Japanese Patent Publication No. Hei 10-118862 and Korean Patent No. 10-230446 acquired by Samsung Electronics Co., Ltd., which is also the owner of the present invention. Otherwise, the illuminating color of an image can be detected with high speed in the chromaticity coordinates by searching several color transition bands, approximating the chromaticity coordinates of pixels included in each color transition band as straight lines, and then, measuring the average of the intersections of the straight lines. The measured average is determined as the illuminating color. This way is disclosed in Korean Patent No. 10-237284 which is also commonly owned with the present invention.

Figure 4:
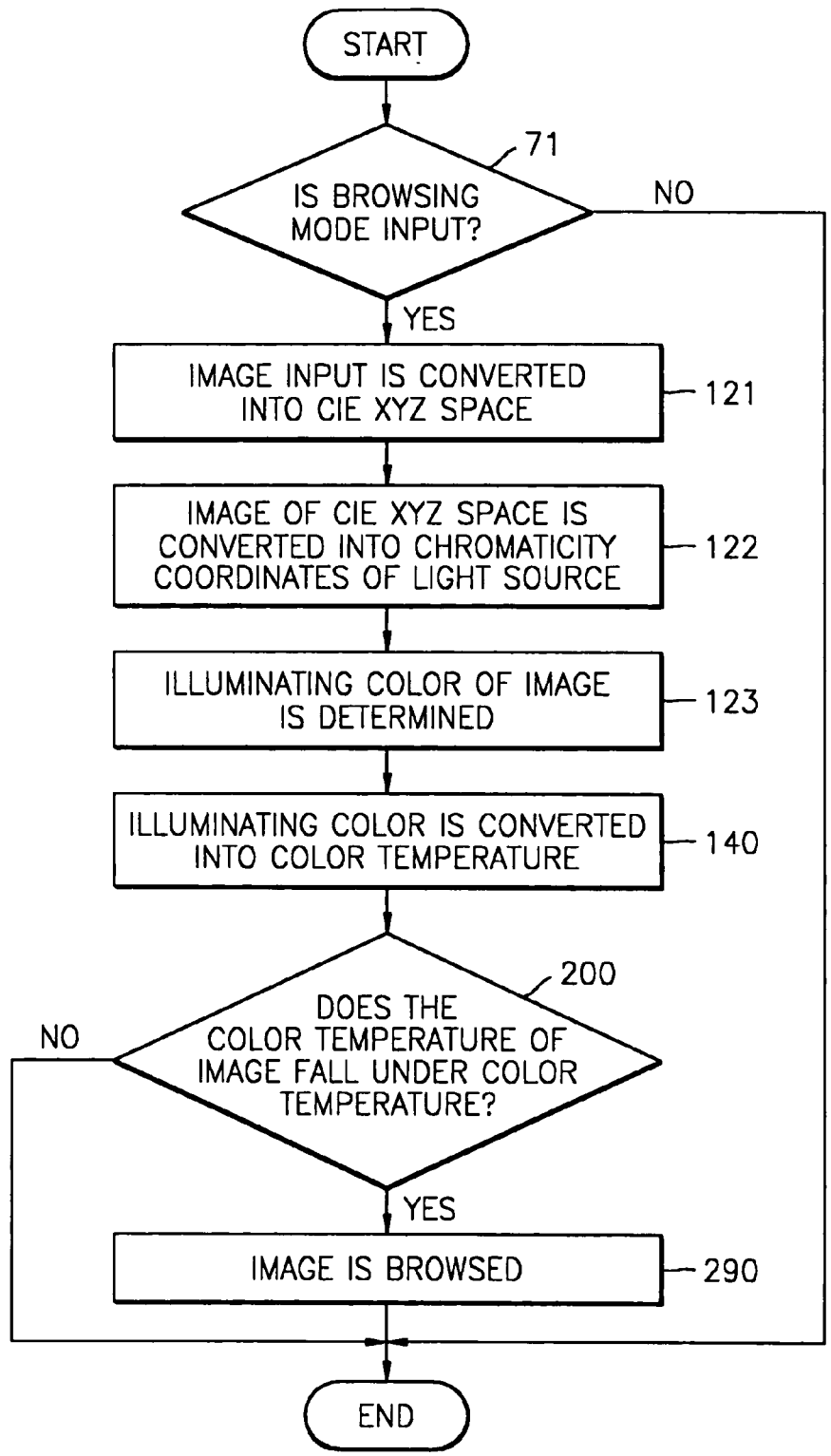
FIG. 4 is a flowchart for explaining one embodiment of a method of browsing an image according to the present invention.
Figure 5:
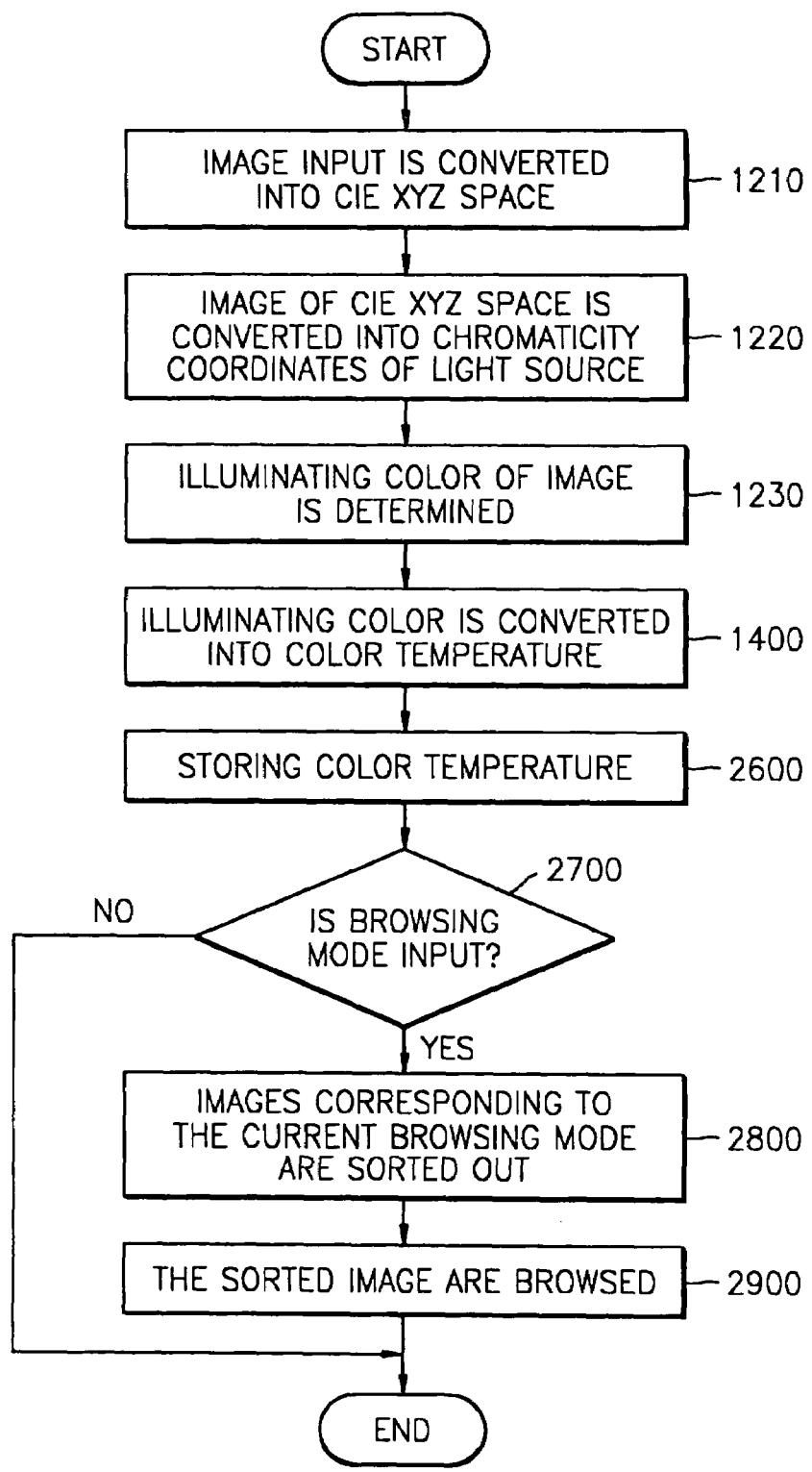
FIG. 5 is a flowchart for explaining another embodiment of a method of browsing an image according to the present invention.

When the illuminating color of an image is determined by the chromaticity coordinates converter 12, the color temperature converter 14 converts the illuminating color into color temperature IMG' [see step 140 of FIG. 4 and step 1400 of FIG. 5]. The color temperature is used in quantifying the extent of warmth and coolness that a human being perceives with respect to an image. In general, the color temperature is obtained by measuring visual energy emitted from a black radioactive element, such as graphite, to which predetermined heat energy is applied. Also, the color temperature is represented by the Kelvin temperature (K°) that is calculated by adding 273° to the Celsius temperature at which an object can present its inherent color.

The color temperature IMG' obtained by the color temperature converter 14 is used as a descriptor that presents the general characteristics of an image. Image data stored in the data storage unit 60 is classified into at least one group, according to the range of the color temperature IMG', by the color temperature browser 20 when images are browsed. That is, images are classified by the user's perceptual temperature image with respect to the image. Each group is expressed with one of browsing modes, e.g., hot, warm, moderate, and cool browsing modes. For example, color temperature IMG' less than or equal to 2250K is included in a hot browsing mode, color temperature IMG' between 2251K and 4170K is included in a warm browsing mode, color temperature IMG' between 4171K and 8060K is included in a moderate browsing mode, and color temperature IMG' larger than or equal to 8061K is included in a cool browsing mode.

FIG. 3 is a view of an example of image browsing performed by the image display apparatus 100 of FIG. 1. In detail, FIG. 3 shows a color temperature browsing screen when it is a hot image browsing mode. For instance, if a user designates the current browsing mode of the hot image group, the image browsing apparatus 30 of FIG. 1 browses hot images out of a plurality of images stored in the data storage unit 60 as shown in FIG. 3. When images that come under a predetermined category are browsed, the user can select a desired image out of the browsed images. That is, because images are classified by their color temperature IMG', images can be easily browsed according to the user's perceptual temperature feeling regarding an image.

FIG. 4 is a flow chart for explaining a first embodiment of a method of browsing images, according to the present invention, using the image display apparatus 100 of FIG. 1. The method of FIG. 4 corresponds to a case in which the color temperature IMG' of an image IMG which was calculated by the color temperature calculator 10 of FIG. 1, is directly used in browsing images without storing the color temperature IMG' in the data storage unit 60.

In the method of browsing an image referring to FIG. 4, it is checked whether a desired browsing mode is input (step 71). Here, the browsing mode is a selection mode of selecting at least one group classified by the user's perceptual temperature feeling regarding the image. In other words, a user can select any one of hot, warm, moderate, and cool browsing modes. Once one browsing mode is selected, an image IMG input is converted into the CIE X, Y, Z color space (step 121). Then, the image of the CIE X, Y, Z color space is converted into the chromaticity coordinates of a light source (step 122). An image can be variously displayed according to the characteristics of a system or data. In the event that an image is not displayed in the CIE X, Y, Z color space, it must be first converted into the CIE X, Y, Z space and then converted into the chromaticity coordinates of a light source. However, the image that is displayed in the CIE X, Y, Z space, can be converted directly into the chromaticity coordinates of a light source.

After converting the coordinates of the image into the chromaticity coordinates of a light source, the illuminating color of the image is determined based on the density of the tone of color of the image or the color transition band (step 123). Next, the determined illuminating color is converted into the color temperature (step 140). Thereafter, it is checked if the color temperature of the image falls within the color temperature range of the current browsing mode (step 200). The relevant image is browsed if the color temperature of the image falls within the color temperature range of the current browsing mode (step 290).

FIG. 5 is a flow chart for explaining a second embodiment of a method of browsing image, according to the present invention, using the image display apparatus 100 of FIG. 1. In the method of FIG. 5, the color temperature IMG' of an image IMG, which was calculated by the color temperature calculator 10 of FIG. 1, is stored in the data storage unit 60 of FIG. 1. Then, when a desired browsing mode is input, an image corresponding to the current browsing mode is browsed based on the stored color temperature IMG'.

In the method of browsing an image referring to FIG. 5, an input image is converted into the CIE X, Y, Z space in step 1210, and then, is converted into the chromaticity coordinates of a light source in step 1220. Thereafter, the illuminating color of the image is determined by one of the aforementioned methods in step 1230. The determined illuminating color is converted into the color temperature in step 1400, and then is stored as meta-data in the data storage unit 60 of FIG. 1 in step 2600. Next, it is checked whether a browsing mode is input in step 2700. If the browsing mode is input, the color temperature stored in the data storage unit 60 can be used as an image search word in assorting images corresponding to the current browsing mode in step 2800. Lastly, the assorted images are browsed in step 2900.

Hereinafter, another embodiment of a method of browsing an image according to the present invention will be described with reference to FIGS. 5 and 6. This embodiment is similar to the above embodiment except that the one of predetermined sections of a color temperature range to which the color temperature of an input image belongs is detected, and the information regarding the detected predetermined section is produced and stored as data.

Figure 6:
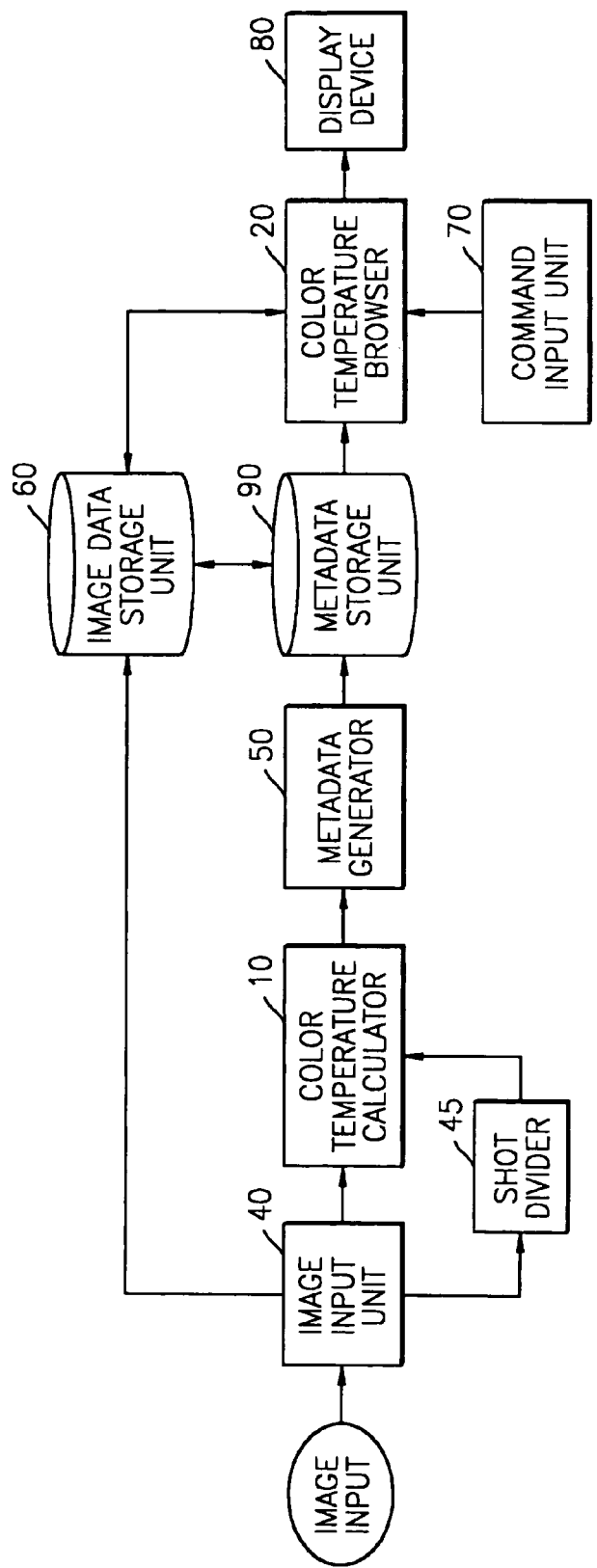
FIG. 6 is a block diagram of the structure of another embodiment of a color temperature browsing apparatus according to the present invention.

FIG. 6 is a block diagram of an embodiment of a color temperature browsing apparatus according to the present invention. The color temperature browsing apparatus of FIG. 6 includes an image input unit 40 that receives an input image; an image data storage unit 60 that holds the received input image; a color temperature calculator 10 that calculates the color temperature of the input image; a metadata generator 50 that generates metadata regarding the input image according to the color temperature of the input image; a metadata storage unit 90 that stores the metadata generated by the metadata generator 50; a command input unit 70 that is given an image browsing mode by a user; and a color temperature browser 20 that makes a search for metadata corresponding to the input image browsing mode, receives an image corresponding to the searched metadata from the image data storage unit 60, and outputs the image. In case that the input image is a moving picture, the color temperature browsing apparatus further includes a shot divider 45 that divides the input image in shot units.

Figure 7:
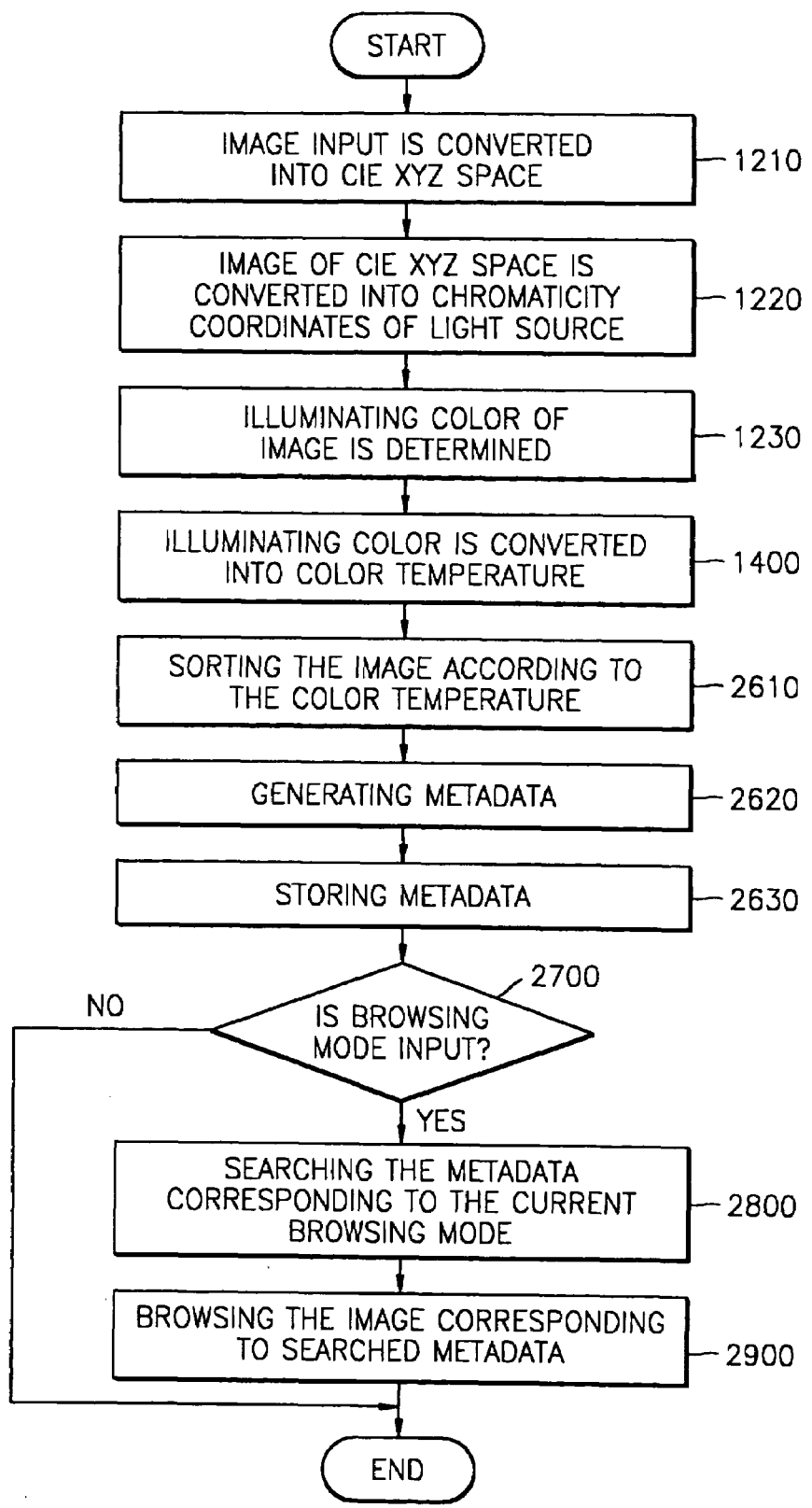
FIG. 7 is a flow chart explaining the operations of the color temperature browsing apparatus of FIG. 6.

FIG. 7 is a flow chart explaining the operations of the color temperature browsing apparatus of FIG. 6. Referring to FIG. 7, the color temperature browsing apparatus of FIG. 6 converts an input image into CIE X, Y, Z space in step 1210 and then converts the coordinates of an image in the CIE X, Y, Z space into chromaticity coordinates of a light source in step 1220. After step 1220, the illuminating color of the image is determined as described above with reference to FIG. 4 in step 1230, converted into color temperature, and output to the metadata generator 50 in step 1400.

After step 1400, the metadata generator 50 classifies the input image by finding finds one of predetermined sections of a color temperature range to which the input image belongs in step 2610 so that a user can browse images according to his or her perceptual temperature feeling of the image, in step 2610. After step 2610, metadata representing color temperature ranges to which input images correspond, i.e., each range includes the color temperature of each input image, is produced in step 2620.

In this embodiment, the color temperature range is primarily divided into M color temperature sections according to the perceptual temperature feeling of a user with respect to an image, and then each of the M color temperature sections is divided into N color temperature sub-sections. As a result, the whole color temperature range is divided into M*N color temperature sub-ranges.

For instance, the color temperature range is divided into four-color temperature sections, e.g., hot, warm, moderate, and cool temperature sections, in a browsing mode selected by a user. Here, hot, warm, moderate, and cool temperature sections may be mapped into a range of less than or equal to 2250K, a range from 2251 K to 4170 K, a range from 4171 K to 8060 K, and a range of more than or equal to 8061 K, respectively.

The metadata generator 50 checks which one of the aforementioned M color temperature ranges the color temperature of each input image belongs to and classifies the input images into four-color temperature sections: hot, warm, moderate, and cool temperature sections. Next, the metadata generator 50 generates a first descriptor as metadata that describes one of four-color temperature sections to which the input images belong. If the aforementioned four-color temperature sections are expressed as metadata with respect to the input images, each image can be expressed with 2 bits. For instance, 00, 01, 10, and 11 may represent a hot image, a warm image, a moderate image, and a cool image, respectively.

However, when a plurality of images stored in the image data storage unit 60 are browsed and displayed with 2-bit metadata, a plurality of images belonging to the same section are displayed at random. This will make the user feel inconvenience when browsing images. To solve this problem, it is required to subdivide the temperature ranges of the hot, warm, moderate, and cool temperature sections.

For this subdivision, reciprocal color temperature scale is used instead of color temperature scale, so that the temperature range for each section is uniformly quantized. First, the color temperature range for each section is converted into a reciprocal color temperature range. The reciprocal color temperature range is subdivided equally, and then, a second descriptor that describes sub-ranges of the color temperature range to which input images belong is reproduced with metadata. Here, reciprocal color temperature (RC) is calculated by an equation: RC=1000000/color temperature (C). Divided N color temperature sub-sections can be expressed with Upper(In(N)) bits. Here, Upper( ) denotes the maximum natural number including an obtained color temperature value, e.g., Upper(2.1)=3. If divided M color temperature sections are divided into N color temperature ranges, the whole color temperature ranges of the input images can be expressed with Upper(In(M))+Upper(In(N)) bits. In this embodiment, because M=4 and N=64, the metadata consists of 2-bit first descriptor and 6-bit second descriptor.

As described above, the metadata generator 50 generates metadata regarding input images and stores the generated metadata into the metadata storage unit 90 in step 2630.

After step 2630, when the user inputs a browsing mode to the command input unit 70 in step 2700, the color temperature browser 20 searches metadata having the first descriptor, which describes a color temperature section corresponding to the color temperature mode like hot, warm, moderate and cool modes in the input browsing mode, in the metadata storage unit 90, in step 2800.

Figure 8:
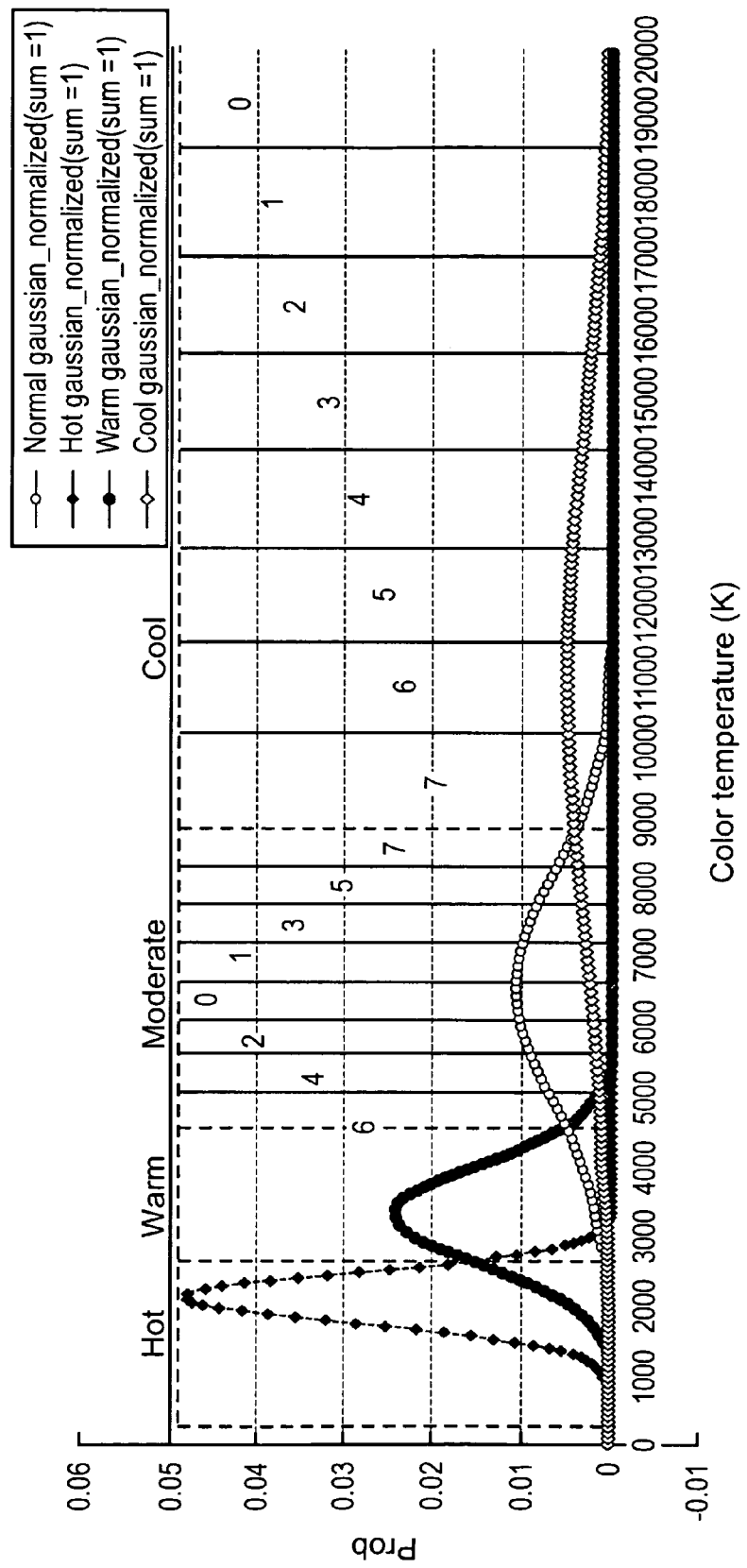
FIG. 8 is a graph illustrating distribution of the color temperature of an image.

The searched image is displayed on the display unit 80. As shown in FIG. 8, according to this embodiment of an image browsing method, for cool image browsing, images are displayed starting from the highest sub-range in the cool color temperature range in a descending order. For the moderate and warm image browsing, the images from a sub-range including a predetermined mean value, e.g., warm mean=2925 K and moderate mean=5500 K, are displayed and then, the images in the subsequent sub-ranges are displayed in an ascending order of deviation from the mean value of the section. Further, for the hot image browsing, the images from the lowest sub-range in the hot color temperature range are displayed and then the images in the subsequent sub-ranges are displayed.

A method of browsing images, according to the present invention, is described with respect to still images, but it can also be applied in browsing moving picture data. That is, a method of browsing images based on the color temperature of an image, according to the present invention, can be applied to an image shot that is composed of a plurality of images. For instance, the video contents such as movies or dramas can be grouped by the unit of predetermined shots at a point when the position of a camera rapidly changes. In general, one video shot is taken under a predetermined light source. For this reason, the color temperature of each image included in one video shot can be indicated as the average or middle value of the color temperature of all the images, and can be used as a color temperature descriptor indicating the whole characteristics of the video shot. The use of the color temperature descriptor in shot units enables image browsing in shot units having similar color temperature in a video. Thus, an image browsing apparatus according to the present invention can be used in browsing moving image video contents, including still images, based on the color temperature.

This invention may be embodied in a general purpose digital computer by running a program from a computer usable medium, including but not limited to storage media such as magnetic storage media (e.g., ROMs, floppy disks, hard disks, etc.), optically readable media (e.g., CD-ROMs, DVDs, etc.) and carrier waves (e.g., transmissions over the Internet). Hence, the present invention may be embodied as a computer usable medium having a computer readable program code unit embodied therein. Also, a computer readable recording medium can be dispersedly installed in computer systems connected one another through the networks, and stores and executes a computer readable code.

While the present invention has been particularly shown and described with reference to preferred embodiments thereof, it will be understood by those skilled in the art that various changes in form and details may be made therein without departing from the spirit and scope of the invention as defined by the appended claims. For instance, materials used in fabricating components required in an ink jet print head according to the present invention can be freely selected. That is, a substrate can be formed of a material that is easily processed, as well as silicon. Also, the components can be formed by various deposition or etching methods.

As described above, according to an image browsing apparatus and a method therefor, a human being's impression regarding an image, such as warmth or coolness, can be quantified as the color temperature of the image. Also, the color temperature of an image is used as an image search condition in classifying images into one or more groups. Accordingly, it is possible to easily browse images corresponding to the current browsing mode, and further, classify and browse images that have similar impression from mass database containing a plurality of image data, or video data.

What is claimed is:

1. An image browsing apparatus comprising:
    a command input unit for inputting an image browsing mode;
    a color temperature calculator for calculating the color temperature of an input image; and
    a color temperature browser for browsing the image when the color temperature falls within the color temperature range of the browsing mode, wherein the color temperature calculator comprises:
        a chromaticity coordinates converter for converting the coordinates of the image into the chromaticity coordinates of a light source, and then, determining an illuminating color of the image based on the chromaticity coordinates; and
        a color temperature converter for converting the illuminating color into the color temperature.

2. The image browsing apparatus of claim 1, wherein the color temperature is obtained by quantifying a user's perceptual temperature feeling with respect to the input image, using the Kelvin temperature scale.

3. The image browsing apparatus of claim 1, wherein the browsing mode is at least one selection mode indicating an extent of an impression of an image, warmth or coolness, that a human being would perceive.

4. The image browsing apparatus of claim 1, wherein the color temperature converter converts the image into the CIE X, Y, Z space, and then converts the image of the CIE X, Y, Z space into the chromaticity coordinates of the light source.

5. An image browsing apparatus comprising:
    a data storage unit for storing a plurality of image data;
    a color temperature calculator for calculating the color temperature of each image and storing the calculated color temperature in the data storage unit;
    a command input unit for inputting an image browsing mode; and
    a color temperature browser for classifying images corresponding to the browsing mode using the color temperature as an image search condition and then, browsing the classified images, wherein the color temperature calculator comprises:
        a chromaticity coordinates converter for converting the coordinates of the image into the chromaticity coordinates of a light source, and then, determining an illuminating color based on the chromaticity coordinates; and
        a color temperature converter for converting the illuminating color into the color temperature.

6. The image browsing apparatus of claim 5, wherein the color temperature is obtained by quantifying a user's perceptual temperature feeling with respect to the images, using the Kelvin temperature scale.

7. The image browsing apparatus of claim 5, wherein the browsing mode is at least one selection mode indicating a user's perceptual temperature feeling with respect to the image.

8. The image browsing apparatus of claim 5, wherein the color temperature converter converts the image into the CIE X, Y, Z space, and then converts the image in the CIE X, Y, Z space into the chromaticity coordinates of the light source.

9. A method of browsing images, comprising:
    determining the color temperature of input images; and
    browsing images the color temperature of which fall within the color temperature range of a selected browsing mode, wherein determining the illuminating color comprises:
        converting the coordinates of the input image into the chromaticity coordinates of a light source;
        determining the illuminating color of the image based on the chromaticity coordinates; and
        converting the illuminating color into the color temperature.

10. The method of claim 9, wherein the color temperature is obtained by quantifying a users perceptual temperature feeling with respect to the image, using the Kelvin temperature scale.

11. The method of claim 9, wherein the browsing mode is at least one selection mode indicating a user's perceptual temperature feeling with respect to the image.

12. The method of claim 9, wherein converting the chromaticity coordinates of the light source comprises:
    converting the image into the CIE X, Y, Z space; and
    converting the image in the CIE X, Y, Z space into the chromaticity coordinates of a light source.

13. A computer readable recording medium for recording a program through which a method according to claim 9 can be executed in a computer.

14. A method of browsing images, comprising:
    determining the color temperature of a plurality of input images;
    storing the color temperature to correspond to the relevant images;
    classifying images corresponding to the browsing mode, using the color temperature as image search condition when a browsing mode is input; and
    browsing the classified images,
    wherein determining the color temperature comprises:
        converting the coordinates of the input image into the chromaticity coordinates of a light source;
        determining the illuminating color of the image based on the chromaticity coordinates; and
        converting the illuminating color into the color temperature.

15. The method of claim 1, wherein the color temperature is obtained by quantifying a user's perceptual temperature feeling with respect to the image, using the Kelvin temperature.

16. The method of claim 14, wherein the browsing mode is at least one selection mode indicating a user's perceptual temperature feeling with respect to the image.

17. The method of claim 14, wherein converting the chromaticity coordinates of the light source comprises:
    converting the image into the CIE X, Y, Z space; and
    converting the image in the CIE X, Y, Z space into the chromaticity coordinates of a light source.

18. A computer readable recording medium for recording a program through which a method according to claim 14 can be executed in a computer.

19. An image browsing apparatus comprising:
    an image data storage unit for storing an input image;
    a color temperature calculator for calculating the color temperature of the input image;

a metadata generator for generating metadata regarding the input image according to color temperature calculated by the color temperature calculator;
a metadata storage unit for storing the metadata generated by the metadata generator;
a command input unit to which an image browsing mode is input by a user;
a color temperature browser for searching metadata representing the image in the range of color temperature to be searched in the image browsing mode, receiving a image corresponding to the searched metadata from the image data storage unit, and outputting the received image; and
an image input unit for dividing the input image in shot units and outputting the divided images to the image data storage unit and the color temperature calculator, in the event that the input image is a moving image.

20. An image browsing apparatus comprising:
an image data storage unit for storing an input image;
a color temperature calculator for calculating the color temperature of the input image;
a metadata generator for generating metadata regarding the input image according to color temperature calculated by the color temperature calculator;
a metadata storage unit for storing the metadata generated by the metadata generator;
a command input unit to which an image browsing mode is input by a user; and
a color temperature browser for searching metadata representing the image in the range of color temperature to be searched in the image browsing mode, receiving a image corresponding to the searched metadata from the image data storage unit, and outputting the received image,
wherein the metadata generator finds one of the predetermined sections of a color temperature range to which an input image belongs and generates metadata including a descriptor that describes the color temperature section which includes the color temperature of the input image.

21. The image browsing apparatus of claim 20, wherein the predetermined sections are four ranges divided according to user's perceptual temperature feeling with respect to a color image, the predetermined sections comprise:
a first section from 1667 K to 2250 K, which is a hot temperature range;
a second section from 2251 K to 4170 K, which is a warm temperature range;
a third section from 4171 K to 8060 K, which is a moderate temperature range; and
a fourth section from 8061 K to 25000 K, which is a cool temperature range, and
the metadata comprises a first descriptor describing one of the first through fourth sections.

22. The image browsing apparatus of claim 21, wherein the each of the four sections is divided into sixty-four sub-ranges by reciprocal color temperature that is obtained by dividing 1000000 by the color temperature of an image, and the metadata comprises a second descriptor representing the sixty-four sub-ranges.

23. The image browsing apparatus of claim 21 further comprising a display device for displaying images output from the color temperature browser,
wherein the images from the lowest sub-range are displayed and then the images in the subsequent sub-ranges are displayed, when the browsing mode corresponds to the first section,
the images are displayed in the ascending order of deviation from the mean value of the section, and
images from the highest sub-range in the fourth section are displayed and then the images in the subsequent sub-ranges are displayed in a descending order, when the browsing mode corresponds to the fourth section.

24. An image browsing method comprising:
(a) calculating the color temperature of an input image, wherein (a) comprises:
(a1) converting the coordinates of the input image into chromaticity coordinates of a light source;
(a2) determining the illuminating color of the input image, using the chromaticity coordinate; and
(a3) converting the illuminating color into the color temperature;
(b) finding one of predetermined sections of a color temperature range to which the color temperature of the input image belongs, and generating and storing metadata having a descriptor that describes information regarding the section to which the color temperature of the input image belongs;
(c) searching metadata having the descriptor describing a section to which the color temperature of a selected browsing mode; and
(d) browsing an image corresponding to the searched metadata.

25. The image browsing method of claim 24, wherein (a1) comprises:
converting the input image into CIE X, Y, Z space; and
converting an image in the CIE X, Y, Z space into chromaticity coordinates of a light source.

26. A computer readable recording medium for recording a program through which a method according to claim 24 can be executed in a computer.

27. An image browsing method comprising:
(a) calculating the color temperature of an input image;
(b) finding one of predetermined sections of a color temperature range to which the color temperature of the input image belongs, and generating and storing metadata having a descriptor that describes information regarding the section to which the color temperature of the input image belongs;
(c) searching metadata having the descriptor describing a section to which the color temperature of a selected browsing mode; and
(d) browsing an image corresponding to the searched metadata,
wherein the predetermined sections are four ranges divided according to a user's perceptual temperature feeling with respect to a color image, and the predetermined sections comprise:
a first section from 1667 K to 2250 K, which is a hot temperature range;
a second section from 2251 K to 4170 K, which is a warm temperature range;
a third section from 4171 K from 8060 K, which is a moderate temperature range; and
a fourth section from 8061 K to 25000 K, which is a cool temperature range.

28. The image browsing mode of claim 27, wherein the each of the four sections is divided into sixty-four sub-ranges by reciprocal color temperature that is obtained by dividing 1000000 by the color temperature of an image, and the metadata comprises a second descriptor describing the sixty-four sub-ranges.

29. An image browsing apparatus comprising:
- an image data storage unit for storing an input image;
- a color temperature calculator for calculating the color temperature of the input image;
- a metadata generator for generating metadata regarding the input image according to color temperature calculated by the color temperature calculator;
- a metadata storage unit for storing the metadata generated by the metadata generator;
- a command input unit to which an image browsing mode is input by a user; and
- a color temperature browser for searching metadata representing the image in the range of color temperature to be searched in the image browsing mode, receiving a image corresponding to the searched metadata from the image data storage unit, and outputting the received image,
- wherein the metadata generator divides the color temperature range into a first predetermined number of color temperature sections, converts each of the first predetermined number of color temperature sections into a reciprocal color temperature section, divides the reciprocal color temperature section into a second predetermined number of reciprocal color temperature sub-sections, and determines a color temperature section to which the color temperature of the input image belongs.

30. The apparatus of claim 29, wherein the metadata generator divides the color temperature range into four color temperature sections based upon how people feel about the images temperature-wise and records the color temperature section to which the color temperature of the input image belongs using 2 bits of the metadata.

31. The apparatus of claim 29, wherein the metadata generator divides each of the reciprocal color temperature sections into 64 reciprocal color temperature sub-sections and records a reciprocal color temperature sub-section to which the color temperature of the input image belongs using 6 bits of the metadata.

32. An image browsing method comprising:
- (a) calculating the color temperature of an input image;
- (b) finding one of predetermined sections of a color temperature range to which the color temperature of the input image belongs, and generating and storing metadata having a descriptor that describes information regarding the section to which the color temperature of the input image belongs;
- (c) searching metadata having the descriptor describing a section to which the color temperature of a selected browsing mode; and
- (d) browsing an image corresponding to the searched metadata, method of claim 29, wherein in step (b), the color temperature range is divided into a first predetermined number of color temperature sections, each of the first predetermined number of color temperature sections is converted into a reciprocal color temperature section, the reciprocal color temperature section is divided into a second predetermined number of reciprocal color temperature sub-sections, and a color temperature section to which the color temperature of the input image belongs is determined.

33. The method of claim 32, wherein in step (b), the color temperature range is divided into four color temperature sections based upon how people feel about the images temperature-wise and the color temperature section to which the color temperature of the input image belongs is recorded using 2 bits of the metadata.

34. A computer-readable recording medium, on which a program enabling the method of claim 33 is recorded.

35. The method of claim 32, wherein each of the reciprocal color temperature sections is divided into 64 reciprocal color temperature sub-sections and a reciprocal color temperature sub-section to which the color temperature of the input image belongs is recorded using 6 bits of the metadata.

36. A computer-readable recording medium, on which a program enabling the method of claim 35 is recorded.

37. A computer-readable recording medium, on which a program enabling the method of claim 32 is recorded.

38. A method of generating a color temperature type of an image, comprising:
- (a) dividing color temperature sections into four perceptual color temperature browsing categories based upon how people feel about images temperature-wise, and recording the perceptual color temperature browsing category to which the color temperature of an image belongs using 2 bits of metadata; and
- (b) dividing each of the four perceptual color temperature browsing categories into 64 color temperature sub-sections, and recording the color temperature sub-section to which the color temperature of an image belongs using 6 bits of metadata.

39. A computer-readable recording medium, on which a program enabling the method of claim 38 is recorded.

40. A method of generating a color temperature type of an image, comprising:
- (a) dividing perceptual color temperature browsing categories into a hot temperature feeling browsing category, a warm temperature feeling browsing category, a moderate temperature feeling browsing category, and a cool temperature feeling browsing category, and recording the temperature feeling browsing category to which the color temperature of an image belongs using 2 bits of metadata; and
- (b) dividing each of the four temperature feeling browsing categories into 64 color temperature sub-sections, and recording the color temperature sub-section to which the color temperature of an image belongs using 6 bits of metadata.

41. A computer-readable recording medium, on which a program enabling the method of claim 40 is recorded.

* * * * *